US005637996A

United States Patent [19]
McDarren et al.

[11] Patent Number: 5,637,996
[45] Date of Patent: Jun. 10, 1997

[54] TOY SYSTEM WITH MOVABLE VEHICLES

[75] Inventors: Robert S. McDarren, Ridgefield; Thomas L. Simmel, Milford, both of Conn.

[73] Assignee: Link Group International, Ridgefield, Conn.

[21] Appl. No.: 342,365

[22] Filed: Nov. 18, 1994

Related U.S. Application Data

[63] Continuation of Ser. No. 13,841, Feb. 5, 1993, abandoned.

[51] Int. Cl.⁶ .......................... G01P 3/66; G01P 3/80; A63F 9/14; A63H 30/02
[52] U.S. Cl. .................. 324/178; 463/59; 446/409; 446/175; 446/441
[58] Field of Search ...................... 324/178, 179, 324/180, 166; 273/86 R, 86 B; 104/DIG. 1

[56] References Cited

U.S. PATENT DOCUMENTS

| | | | |
|---|---|---|---|
| 3,163,819 | 12/1964 | Calhoun | 324/99 D |
| 3,546,668 | 12/1970 | Legler et al. | 324/166 |
| 4,574,238 | 3/1986 | Weinlich | 324/178 |
| 4,727,310 | 2/1988 | Hashimoto et al. | 324/99 D |
| 4,959,807 | 9/1990 | Thompson et al. | 324/178 |

FOREIGN PATENT DOCUMENTS

| 2093593 | 2/1982 | United Kingdom | 324/178 |

*Primary Examiner*—Walter E. Snow
*Attorney, Agent, or Firm*—Melvin I. Stoltz

[57] ABSTRACT

A toy speed measuring and voice reporting system is disclosed. The system measures the speed of a toy car and reports the speed contemporaneously in audible speech. The system employs optical detectors and timing circuitry to compute the speed, and a voice synthesizer to sound the speed values and other messages.

3 Claims, 3 Drawing Sheets

TOY SYSTEM WITH MOVABLE VEHICLES

RELATED APPLICATIONS

This application is a continuation application of U.S. Ser. No. 08/013,841, filed Feb. 5, 1993, abandoned.

BACKGROUND OF THE INVENTION

The present invention relates to a toy system for measuring, or timing or recording events, particularly for measuring the speed of a toy vehicle and indicating same.

The entertainment value of a high speed toy vehicle, such as the one described in U.S. Pat. No. 5,173,071 (Hoeting), may be significantly enhanced by owing the relative speeds that the toy vehicle attains after being launched by the user. For example, knowledge of the relative performance of the toy vehicles, such as the combination of velocity, acceleration or both, can be used in competition between a plurality of participants to conveniently determine a winner, or to provide a highest speed which other participants try to beat.

OBJECTS AND SUMMARY OF THE INVENTION

It is an object of the invention disclosed herein to provide a toy measuring system to measure time-related events, speed, etc., that is simple to use and does not require complex set-up and calibration, particularly for use in measuring the speed of toy vehicles.

It is another object of the invention to provide a toy measuring system to measure time-related events, speed, etc. which is relatively simple and inexpensive to manufacture.

It is another object of the invention to provide a measuring system to measure time-related events, speed, etc. that provides measurement results in speech form.

It is another object of the invention to provide the measurement results in audible speech form contemporaneously with the time the measurement is made.

It is another object of the invention to provide a toy measuring system to measure time-related events, speed, etc. requiring only an ON switch to initiate the system and prepare it to deliver in audible speech form the results of the measurements taken.

The above and other objects are achieved by a toy measuring system which measures time-related events, motion, speed, etc., and which gives a voice report of the measurement results. In the preferred embodiment the toy system measures speed and in audible speech contemporaneously enunciates speed values corresponding to the measurements. While the preferred embodiment measures speed, the invention is applicable to many time-related measurements and event detection, and to monitoring sequential events, and to reporting same in audible speech form.

A toy measuring and voice reporting system according to the invention comprises detecting or sensing means for detecting motion of a toy, determining means coupled to the detecting means for determining the value of a parameter, e.g., speed, related to the motion of the toy, voice signal means for providing in audible speech the determined value.

For speed measurements, the detecting means detects motion such that the speed of the toy may be determined by the determining means. The determining means determines speeds of the toy in response to motion detected by the detecting means. The voice signal means provides voice signals defining the speed values. The audible speech means provides audible speech stating the speed values.

Storing means are provided for storing signals corresponding to values of the parameter, and the voice signal means selects a parameter value from the storing means in dependence upon the value determined by the determining means. The storing means preferably comprises a ROM and the voice signal means preferably comprises a voice synthesizer circuit. The determining means preferably comprises a computing circuit responsive to the detecting means to compute the parameter.

In a preferred embodiment, the detecting means comprises a first detector or sensor at first location and second detector or sensor at a second location positioned to sense the presence of a toy at, or a toy passing through, the first and second locations. The determining means is responsive to signals from the first and second sensors to determine the speed of the toy. The first and second sensors are preferably optical sensors of the photo-emit and photo-detect type which provide an electrical signal output in the response to interruption of light to the detect part of the sensor.

In a specific embodiment, the measuring and reporting system comprises means for determining a time difference between a first event at a first location and a second event at a second location. Means measure the length of a time interval between the first event and the second event. Storing means (e.g. ROM) store signals representing a plurality of performance reporting messages. Means select one performance reporting message from the plurality of stored performance reporting messages in accordance with the length of the time interval. The signals for the selected performance reporting message are generated by means for generating audible sound from the signal representing selected performance message, e.g. a sound synthesizer.

In a specific embodiment for speed detection and reporting, the system comprises a tunnel-like structure through which a toy vehicle is guided. The tunnel-like structure has an entrance and an exit. A first light emitting source is located at the entrance of the tunnel-like structure and second light emitting light is located at the exit of the tunnel-like structure. A first light detector is positioned opposite the first light source for detecting a first discontinuity of light from the first light source caused by the toy vehicle passing between the first light source and the first light detector. A second light detector is positioned opposite the second light source for detecting a second discontinuity of light from the second light source caused by the toy vehicle passing between the second light source and the second light detector. A timing means for measuring the length of a time interval between the first discontinuity of light and the second discontinuity of light is provided. The selecting means selects a speed message from the plurality of stored messages in response to the length of the time interval and directs the selected message for conversion to audible sound.

BRIEF DESCRIPTION OF THE DRAWINGS

The invention is illustrated by way of example and not limitation in the figures of the accompanying drawings in which like references denote the same or corresponding parts, and in which.

DESCRIPTION OF THE PREFERRED EMBODIMENTS

Figure 1:
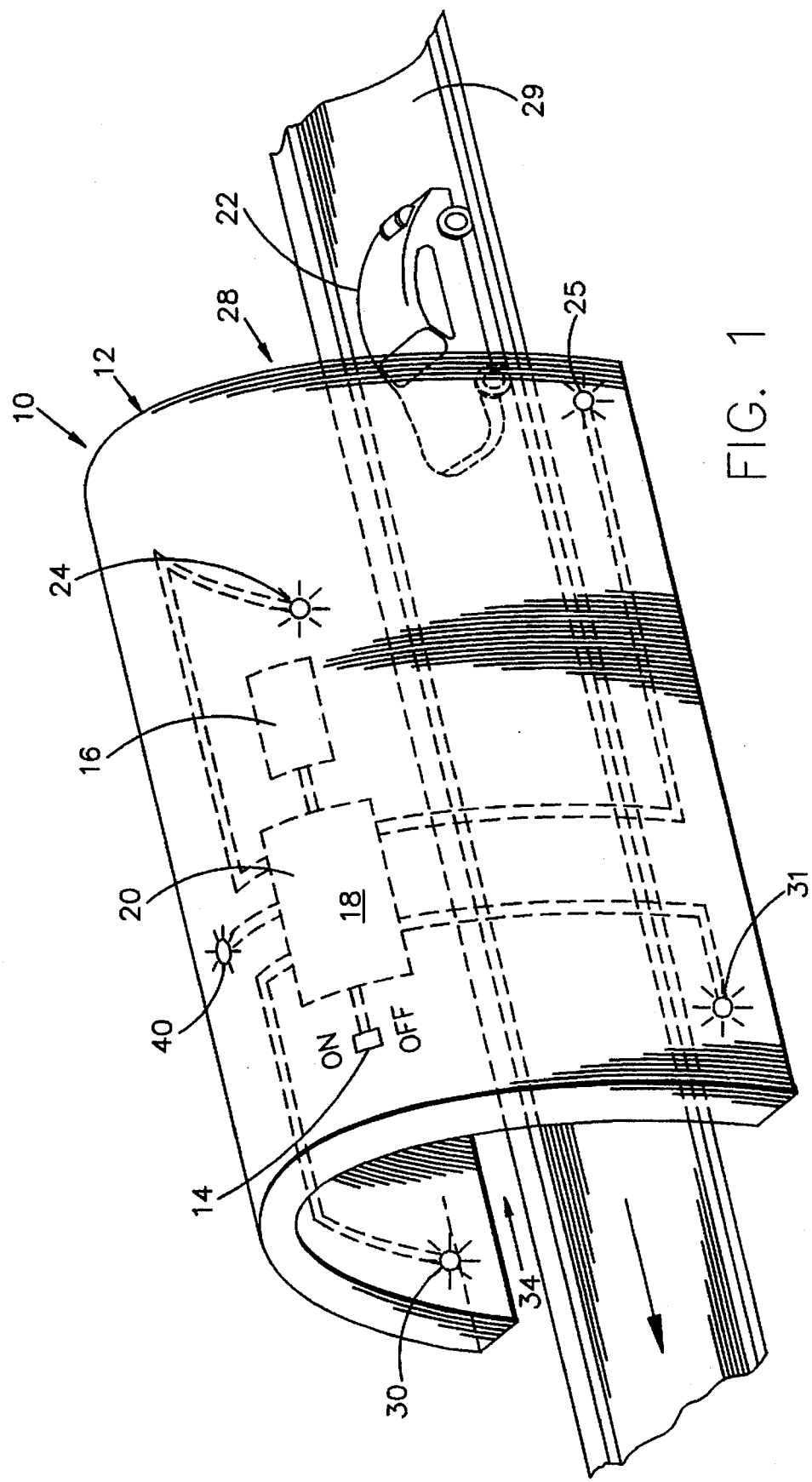
FIG. 1 is a dragramatic perspective view of a toy measuring and voice reporting system according to the invention for measuring the speed of a toy vehicle passing through a tunnel into which the system is incorporated.

Referring to FIG. 1, a toy speed measuring and voice reporting system 10 is incorporated in a tunnel 12. ON/OFF switch 14 connects power from a battery 16 to a circuit 18 mounted on a PC board 20. A speaker (not shown in FIG. 1) is also connected to circuit board, and is used for enunciating various messages related to the performance a toy of car 22 as it passes through tunnel 12. System 10 includes a first light source 24 (in the form of a light emitting drode, LED1 in FIG. 2) opposite a first light detector 25 (in the form of a photo-detect transistor, sensor 1 in FIG. 2), which are located at the tunnel entrance 28. The light source 24 and the detector 25 are positioned above a track 29 passing through tunnel 12 in such manner that passage of toy car 22 on track 29 will interrupt a light beam from light source 24. The passage of toy car 22 between light source 24 and light detector 25 to interrupt the beam of light is a first event which causes detector 25 to produce a signal which is transmitted via conductors to circuit 18. A second light source 30 (LED 2 in FIG. 2) and a second light detector 32 (sensor 2 in FIG. 2) are positioned on opposite sides of tunnel 12 above track 29, at the exit 34 of tunnel 12. As described for light source 24 and light detector 25, light source 30 and light detector 32 are positioned so that passage of car 22 will interrupt the beam of light emitted by light source 30. Passage of car 22 between light source 30 and light detector 32 to interrupt the beam of light from light source 30 is a second event which produces a pulse from light detector 32 which is transmitted via conductors to circuit 18.

A light bulb 40 is connected to circuit 18 and is activated whenever system 10 is ready to make a performance measurement of a car 22 passing through tunnel 12.

Figure 2:
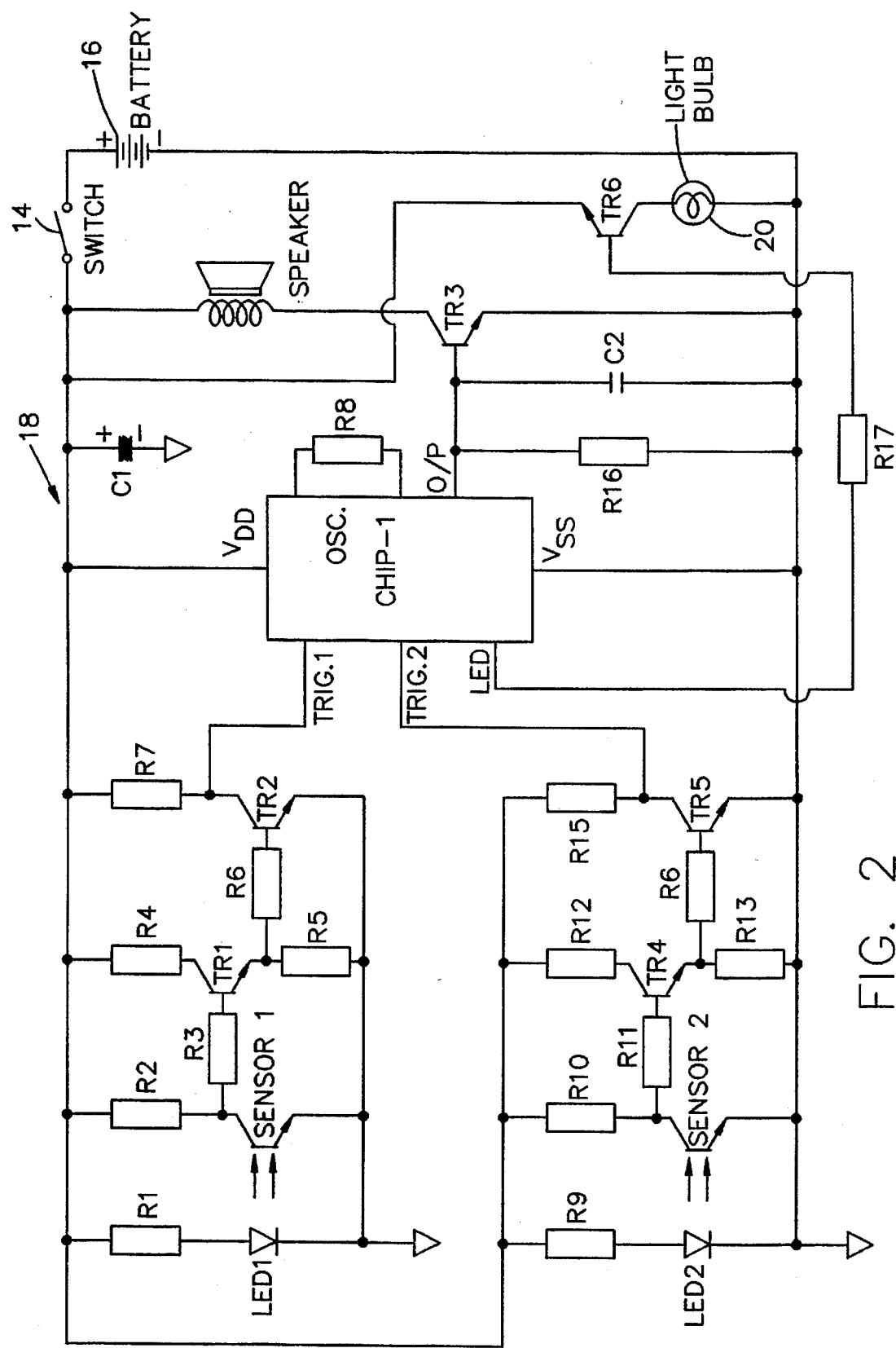
FIG. 2 is a schematic diagram of the circuit of the toy system of FIG. 1.

Referring to FIG. 2, battery 16 supplies current via ON/OFF switch 14 to the electronic components in circuit 18. All elements shown in FIG. 2 are mounted on PC board 20 except battery 16, switch 14, light bulb 25, light sources 24, 30 and detectors 25, 31.

Referring to FIG. 2, when switch 14 is tuned on, LED1 emits light which is detected by photo detector sensor 1, amplified and provided as a constant level input to the Trig.1 input of the integrated circuit Chip-1. Similarly LED2 emits light which is detected by photo detector sensor 2, amplified and provided as a constant level input to the Trig.2 input of integrated circuit Chip-2.

CHIP-1 is a custom programmable speech synthesizer integrated circuit available from WINDBOND as W52515. A block diagram of the WINDBOND W52515 IC is depicted in FIG. 3, and the preliminary specification sheets for the WINDBOND W52515 are appended hereto as Exhibit A.

The O/P output of CHIP-1 (SPK in FIG. 3) is coupled to the base of transistor Tr3 which drives the speaker. The LED output of CHIP-1 (LED1 on FIG. 3) is coupled to the base of transistor Tr6 through a resistor R17. The collector-emitter circuit of transistor Tr3 is connected between battery 16 and light bulb 20. A resistor R8 is coupled to the OSC inputs of IC.

Figure 3:
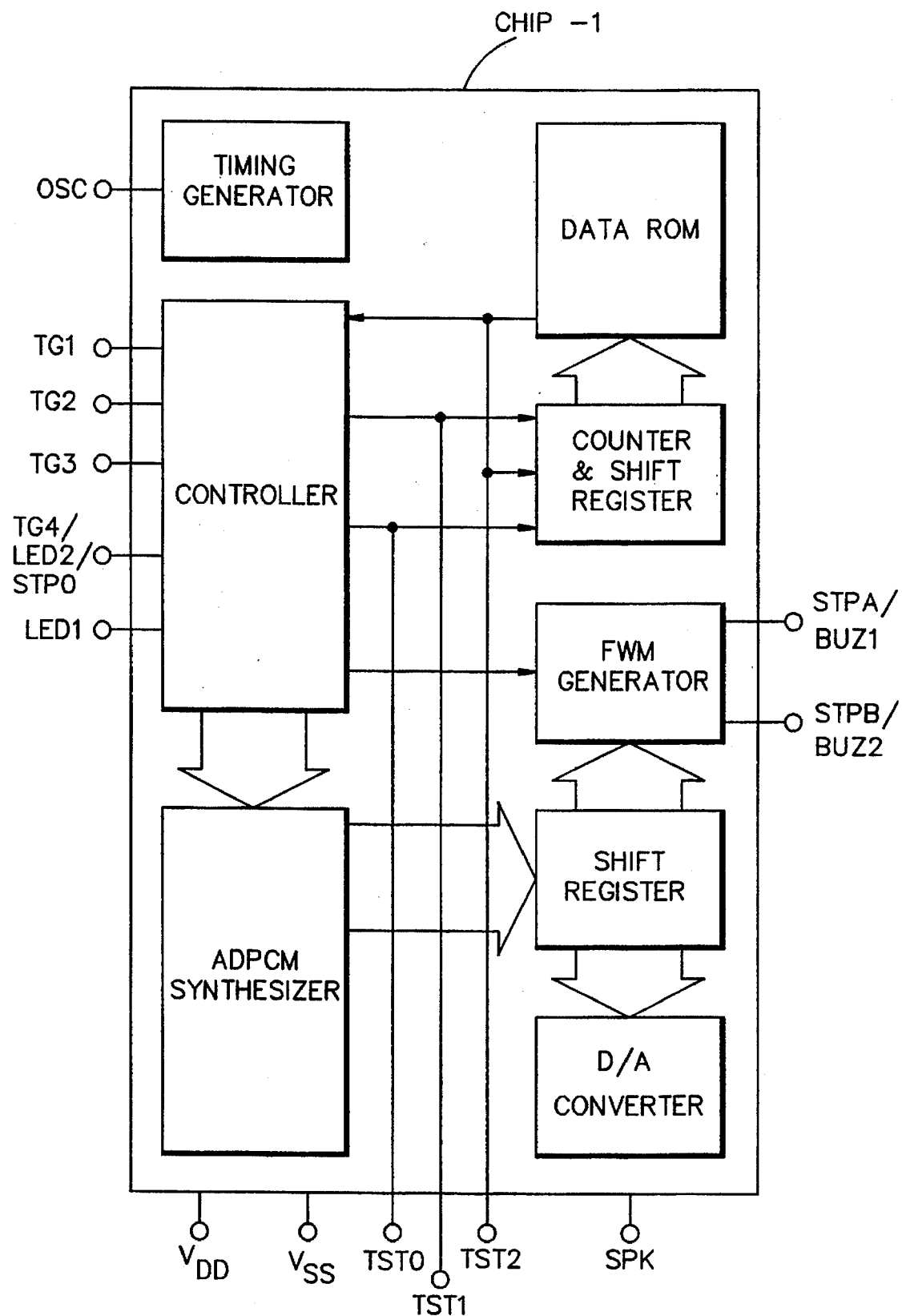
FIG. 3 is the block diagram of an integrated circuit used in the circuit of FIG. 2.

Referring to FIG. 3, IC utilizes ADPCM coding methods to generate various types of sound effects. A built-in 384 Kbit ROM stores samples used in the synthesis of various sounds such as speech. The trigger 1 (TRIG-1) and trigger 2 (TRIG-2) inputs of CHIP-1 are supplied by a controller. The controller controls a counter and shift register for addressing the internal data ROM. The data stored in the data ROM is used by the controller to synthesize certain sounds using an ADPCM synthesizer. A timing generator generates a time base that can be used for timing purposes. The output of ADPMC synthesizer is fed to a shift register for outputting the message through a D/A analog converter on the SPK output, which is supplied to transistor Tr3 (FIG. 2) and the speaker. LED 1 output from CHIP-1 operates transistor Tr6 to turn lamp 20 (FIG. 2) on and off.

Entry of a car on track 29 into tunnel 12 interrupts the light beam to detector 25, which causes a pulse to be input to the TRIG-1 input of CHIP-1. The pulse input to the TRIG-1 initiates a timing mechanism within CHIP-1 which is read when the light beam from light source 30 at the exit of tunnel is interrupted by the car exiting the tunnel, which generates a pulse at the TRIG.2 input of IC. The time between the two pulses input to CHIP-1 are used to address data ROM corresponding to the value of the time interval between the pulses. This causes the message stored on the data ROM to be synthesized into sound, which is output form CHIP-1 O/P output to transistor Tr3 to drive the speaker.

Table 1 below lists typical synthesized messages associated with a specific time interval for the passage of a car between sensor 25 designated as A and the sensor 31, designated as B. Other phrases used to expand or substitute for the synthesized message in Table 1 are listed in Table 2. To enhance play value, various other messages or sound effects may be sounded, for example car sounds, etc.

TABLE I

| NO. | ITEM | TIME INTERVAL | SYNTHESIZED MESSAGE |
| --- | --- | --- | --- |
| 1 | A to B | 0.0220 Sec. | over 199 Miles/Hour |
| 2 | A to B | 0.0225 Sec. | 195 Miles/Hour |
| 3 | A to B | 0.0234 Sec. | 187 Miles/Hour |
| 4 | A to B | 0.0246 Sec. | 178 Miles/Hour |
| 5 | A to B | 0.0253 Sec. | 173 Miles/Hour |
| 6 | A to B | 0.0260 Sec. | 169 Miles/Hour |
| 7 | A to B | 0.0280 Sec. | 155 Miles/Hour |
| 8 | A to B | 0.0288 Sec. | 152 Miles/Hour |
| 9 | A to B | 0.0299 Sec. | 146 Miles/Hour |
| 10 | A to B | 0.0330 Sec. | 133 Miles/Hour |
| 11 | A to B | 0.0360 Sec. | 121 Miles/Hour |
| 12 | A to B | 0.0388 Sec. | 119 Miles/Hour |
| 13 | A to B | 0.0384 Sec. | 114 Miles/Hour |
| 14 | A to B | 0.0410 Sec. | 107 Miles/Hour |
| 15 | A to B | 0.0433 Sec. | 101 Miles/Hour |
| 16 | A to B | 0.0438 Sec. | Under 100 Miles/Hour Disqualified |

TABLE 2

| No. | Phrase | Synthesized Message |
| --- | --- | --- |
| 1 | Phrase 1: | Under 100 Miles Per Hour, disqualified |
| 2 | Phrase 2: | Miles Per Hour |
| 3 | Phrase 3: | 101 |
| 4 | Phrase 4: | 107 |
| 5 | Phrase 5: | 114 |
| 6 | Phrase 6: | 119 |
| 7 | Phrase 7: | 121 |
| 8 | Phrase 8: | 133 |

TABLE 2-continued

| No. | Phrase | Synthesized Message |
| --- | --- | --- |
| 9 | Phrase 9: | 146 |
| 10 | Phrase 10: | 152 |
| 11 | Phrase 11: | 155 |
| 12 | Phrase 12: | 169 |
| 13 | Phrase 13: | 173 |
| 14 | Phrase 14: | 178 |
| 15 | Phrase 15: | 187 |
| 16 | Phrase 16: | 195 |
| 17 | Phrase 17: | Over 199 |
| 18 | Phrase 18: | Sound Of Car Passing By In High Speed |

What is claimed is:

1. A toy system for providing enhanced enjoyment and entertainment and comprising:
   A. a defined pathway;
   B. at least one vehicle constructed to advance along the defined pathway;
   C. a first optical sensor
      a. fixedly mounted along the pathway,
      b. positioned for sensing the movement of the vehicle thereby, and
      c. constructed for delivering a first signal in response to the movement of the vehicle;
   D. a second optical sensor
      a. fixedly mounted along the pathway at a spaced distance from the first sensor,
      b. positioned for sensing the movement of the vehicle thereby, and
      c. constructed for delivering a second signal in response to the movement of the vehicle;
   E. computer means connected to the first and second sensors for receiving the first and second signals, processing said signals to determine the vehicle speed, and transmitting a third signal corresponding to the determined speed value; and
   F. voice synthesizing means
      a. connected to the computer means for receiving the third signal therefrom; and
      b. producing an audible output corresponding to the verbal enunciation of the speed value as received from the computer means, whereby a toy system is attained which is capable of accurately measuring and determining the speed of a moving vehicle and providing added excitement and enjoyment to the user by verbally enunciating the measured speed.

2. The toy system of claim 1 including storing means for storing signals corresponding to values of said vehicle speed, and wherein said audible output selects the speed value from said storing means in dependence upon the speed determined by said computer means.

3. The toy system of claim 2 wherein said storing means comprises ROM.

* * * * *